Feb. 20, 1951 H. C. LAWRENCE, JR., ET AL 2,542,685

ELECTRONIC COUNTER

Filed Feb. 27, 1948 2 Sheets-Sheet 1

INVENTOR
HOWARD C. LAWRENCE, JR.
& ROBERT R. FREAS, JR.
BY Morris L. Levin
ATTORNEY Feb. 20, 1951 H. C. LAWRENCE, JR., ET AL 2,542,685

ELECTRONIC COUNTER

Filed Feb. 27, 1948 2 Sheets-Sheet 2

INVENTOR
HOWARD C. LAWRENCE, JR.
& ROBERT R. FREAS, JR.
BY Morris A. Rabkin
ATTORNEY Patented Feb. 20, 1951 2,542,685

UNITED STATES PATENT OFFICE 2,542,685

ELECTRONIC COUNTER

Howard C. Lawrence, Jr., Haddonfield, N. J., and Robert R. Freas, Jr., Jermyn, Pa., assignors to Radio Corporation of America, a corporation of Delaware Application February 27, 1948, Serial No. 11,823

2 Claims. (Cl. 250—27)

Figure 1:
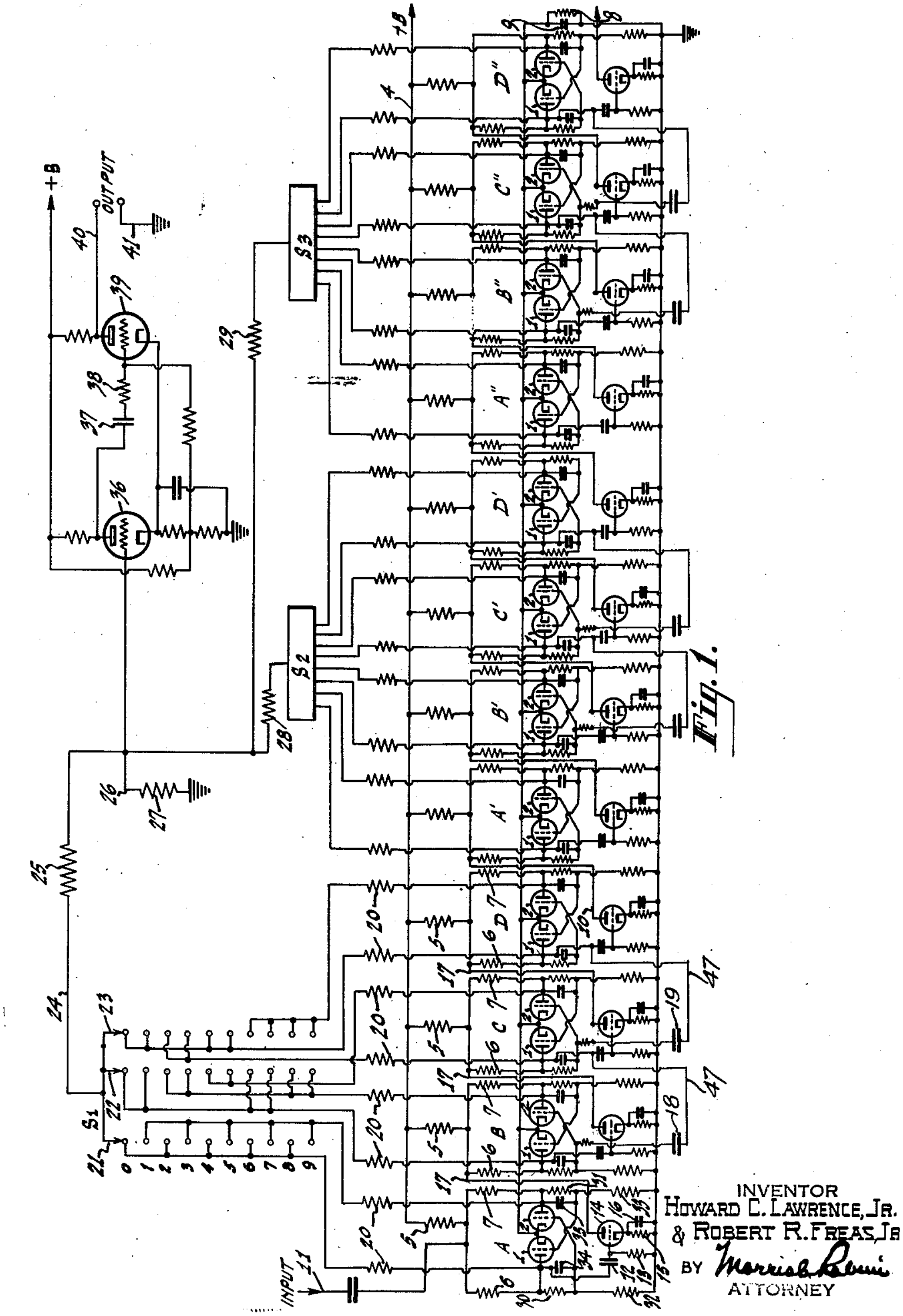

This invention relates to electronic counters which include a plurality of trigger circuits connected in tandem, and has for its principal object the provision of an improved counter of this type which functions to deliver an output of a more nearly square wave form than those heretofore delivered by such counters.

The output wave forms produced by counters heretofore available have been sloped or rounded at their leading edges. This type of wave form is unsatisfactory for various purposes, as hereinafter explained in connection with Figs. 2 to 4 of the accompanying drawings. For example, where outputs from the different sections or decades of a counter are to be added, the output from the lowest decade (highest speed) may be superimposed on the slope of the following decades in such a way as to produce a resultant potential which is less than the sum of the outputs of all the decades. This is a severe restriction on the usefulness of counters in cases where it is required that the operating cycle of the counter be made adjustable, and, in addition, a control pulse produced whose timing from the start of the counter cycle varies in response to the settings of switches which may be calibrated in microseconds.

It has been found that this distortion in the wave form of the pulses delivered by the counter results mainly (1) from the use of trigger circuit elements having constants which are too large and (2) from unequal loading on the two sides of a trigger circuit which is coupled to and drives a following trigger circuit or counter stage.

In accordance with the present invention, such distortion is minimized by selecting the circuit constants in accordance with high frequency amplifier techniques and by reducing the loading on the driver side of the trigger circuits to an absolute minimum. The selection of circuit constants in accordance with high frequency amplifier techniques involves the use of resistors and capacitors of much smaller value than those heretofore used in counter circuits of the type under consideration. The reduction of the loading on the driver side of the trigger circuits involves inter-coupling successive counter stages through a differentiating network and an amplifier. It is found that these changes in the counter circuit result in an output pulse having a much more nearly square wave form than that produced by counters heretofore available.

Important objects of the invention are the provision of an improved counter with circuit constants of such low value that the counter output square waves are not appreciably distorted, and the provision of an improved counter with interstage coupling such that loading of the driver sides of its stages is reduced to negligible value.

The invention will be better understood from the following description considered in connection with the accompanying drawings and its scope is indicated by the appended claims.

Figure 2:
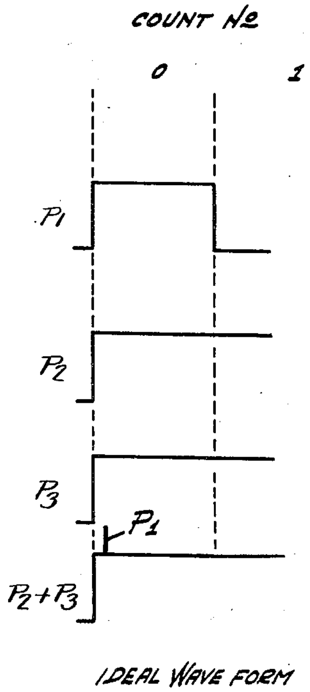
Figure 3:
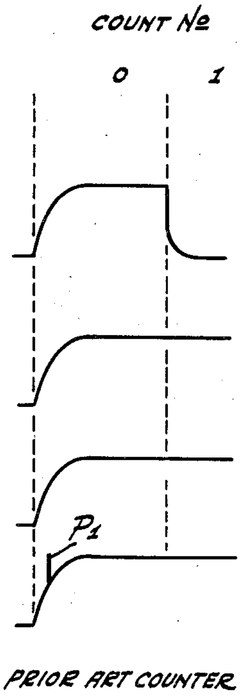
Figure 4:
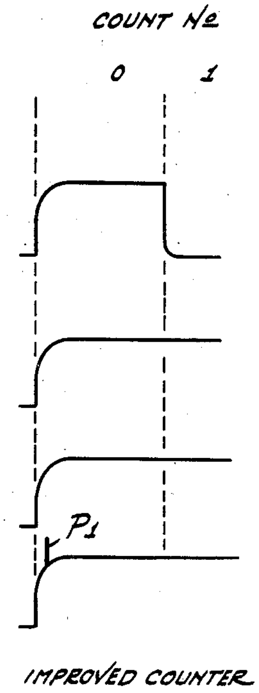

Referring to the drawings:

Fig. 1 is a wiring diagram showing the connections of a preferred form of the invention, and Figs. 2 to 4 are explanatory curves relating to the operation of the counter of Fig. 1.

The counter of Fig. 1 is shown as including three decade sections A—B—C—D, A′—B′—C′—D′ and A″—B″—C″—D″. Since all three decades are alike, only the first will be described in detail.

The first of the decades includes four trigger circuits or stages A, B, C and D which are so coupled with one another as to produce one output pulse at a lead 10 for every ten pulses applied to an input lead 11. Each of the trigger circuits includes a pair of triode elements 1 and 2 which (1) have operating potential applied to their anodes from a lead 4 through a common resistor 5 and separate resistors 6 and 7, (2) have their cathodes connected to ground through a resistor 8 which is shunted by a capacitor 9, and (3) have their anodes each cross-connected to the grid of the other through a resistor which is shunted by a capacitor.

All the trigger circuits have constants such that only one of the triodes conducts current at a time and current conduction is transferred from one to the other of the triodes in response to the application of a negative pulse at the junction between the resistors 5, 6 and 7.

The forward coupling elements between the different stages of the counter each includes a differentiating circuit 12—13 and an amplifier 14. Thus the anode of the triode 1 of the stage A is coupled through a capacitor 12 to the grid of the amplifier 14 and to a resistor 13 which is grounded at its other end. The cathode of the amplifier 14 is grounded through a resistor 15 shunted by a capacitor 16 and its anode is connected through a lead 17 to the common junction point of the anode resistors 5, 6 and 7 of the stage B.

With these connections, the amplifier 14 is biased off when current conduction goes from the triode 2 to the triode 1 of stage A and current is drawn through the resistor 6. When current conduction goes from triode 1 to triode 2 of stage A, however, the amplifier 14 is pulsed on momentarily and current is drawn through the resistor 5 of stage B thereby producing a sharp negative pulse by which the current conductive condition of stage B is changed.

In addition to the forward couplings just described, each of the decades includes two feedback couplings like those shown in Fig. 2 of a copending application of Igor E. Grosdoff, Ser. No. 580,446, filed March 1, 1945 now Patent No. 2,521,788. Thus, in the first decade A—B—C—D, the grid of triode 2 of stage B is coupled through a capacitor 18, lead 47 and a resistor to the anode of triode 1 of stage C. Likewise the grid of triode 2 of stage C is coupled through a capacitor 19, a lead 47 and a resistor to anode of triode 1 of stage D. It will be noted that the feedback couplings of all three decades are alike and all the decades have the same cycle of operation.

In the zero count or standby condition of the counter, current conduction is in the triode 2 of each of the stages. The operating cycle of the decade A—B—C—D is indicated by the following tabulation wherein the number of pulses applied to the input lead 11 are indicated by the numerals of the first column and the other columns show which triode of the stages A, B, C and D are conducting current. It will be noted that after the fourth input pulse, current conduction goes from triode 2 to triode 1 of stage B when current conduction goes from triode 2 to triode 1 of stage C and that after the sixth input pulse a similar effect is produced between the stages C and D.

| Pulse | A | B | C | D |
|---|---|---|---|---|
| 0 | 2 | 2 | 2 | 2 |
| 1 | 1 | 2 | 2 | 2 |
| 2 | 2 | 1 | 2 | 2 |
| 3 | 1 | 1 | 2 | 2 |
| 4 | 2 | 2 | 1 | 2 |
| -- | -- | 1 | -- | -- |
| 5 | 1 | 1 | 1 | 2 |
| 6 | 2 | 2 | 2 | 1 |
| -- | -- | -- | 1 | -- |
| 7 | 1 | 2 | 1 | 1 |
| 8 | 2 | 1 | 1 | 1 |
| 9 | 1 | 1 | 1 | 1 |
| 10 | 2 | 2 | 2 | 2 |

The anodes of the stages A, B, C and D are each connected through a different resistor 20 to a different fixed contact of a three point switch S1, the stages A′, B′, C′ and D′ are similarly connected to a switch S2, and the stages A″, B″, C″ and D″ are connected to a switch S3 in the same way.

The switch S1 includes the contacts 21, 22 and 23 which are arranged so that each moves along a different row of the fixed contacts. By comparing the arrangement of the fixed contacts with the above tabulation, it is easy to see that the most positive potential is applied to the output lead 24 only when the number of input pulses applied to the input lead 11 corresponds to the switch position indicated by the numerals at the left-hand side of the fixed contacts.

Thus, if the movable contacts 21, 22 and 23 are in the "4" position, for example, the output lead 24 is connected to the anodes A1, C2 and D1. As shown by the tabulation, all these anodes are not conducting and have their highest potential simultaneously only at the count of 4. In the same way, the lead 24 is made more positive at the selected count than for any other setting of the switch S1.

What has been said about the decade A—B—C—D and the switch S1 is also true of the decades A′—B′—C′—D′ and A″—B″—C″—D″ and their respective selector switches S2 and S3.

The output lead 24 is connected through a resistor 25 to the high voltage lead 26 of a resistor 27. The output leads of the switches S2 and S3 are connected respectively through the resistors 28 and 29 to the lead 26. The resistors 25, 28 and 29 are known in the art as summing resistors. Through these resistors, there are applied to the grid of the tube 36 (1) a voltage $P_1$ from the switch S1, (2) a voltage $P_2$ from the switch S2 and (3) a voltage $P_3$ from the switch S3. These voltages are indicated by the first three sets of curves of Figs. 2 to 4. In the last set of curves of these figures, which are not drawn to the same scale as the preceding curves, the broad pedestal represents the sum of the voltages $P_2$ and $P_3$ and the superimposed narrow pedestal represents the voltage $P_1$. When three voltages are applied to the input of a summing amplifier, there is produced at the output of such amplifier a voltage which is of opposite polarity and is equal to the sum of the input voltages.

If the output potentials of the switches S1, S2 and S3 are of square wave form, such as those of Fig. 2, the resultant potential produced at the output lead 26 is the sum of these output potentials and may be utilized to produce a desired effect only when the number of pulses applied to the input lead 11 is equal to any number from 1 to 1.000 determined by the setting of the selector switches S1, S2 and S3. Under these conditions, the output potential of the switch S2 is superimposed on that of the switch S3 and that of S1 is superimposed on that of S2.

As previously indicated, however, counters of conventional design produce output potentials like those of Fig. 3. It will be noted that in this case the potential $P_1$ produced at the lead 26 by the decade A—B—C—D is not positioned at the top of the pedestal produced by the decades A′—B′—C′—D′ and A″—B″—C″—D″ and the resultant potential at the lead 26 is no longer proportional to the sum of the output potentials of the switches S1, S2 and S3. This difficulty is avoided by the counter of the present invention which produces at the lead 26 a broad pedestal which is more nearly square. Due to this more nearly square shape of the broad pedestal produced by the voltages $P_2$ and $P_3$, the total height of the broad and narrow pedestals more closely represents the sum of the three potentials.

As indicated above, this result is achieved in part by inter-coupling the counter stages through a differentiating circuit and amplifier by which loading on the driver side of the stage is rendered negligible and in part by using resistors and capacitors of lower values than has been customary. The relation between the normal and revised values is indicated by the following tabulation wherein the first column shows the reference numeral of the element. the second column shows the normal value of the element as utilized in a conventional counter, and the third column shows the revised value of the element as utilized in a counter of the present invention.

| Element | Normal value | Revised value |
|---|---|---|
| 5 ohms | 12,000 | 6,800 |
| 6 do | 22,000 | 6,800 |
| 7 do | 22,000 | 6,800 |
| 30 do | 120,000 | 39,000 |
| 31 do | 120,000 | 33,000 |
| 32 do | 100,000 | 33,000 |
| 33 do | 100,000 | 33,000 |
| 34 mmf | 68 | 47 |
| 35 mmf | 100 | 47 |

It will be noted that the revised values are much lower than the normal values and are selected in accordance with high frequency techniques as indicated above. The effect of these lower circuit component values is to substantially eliminate the effects of stray capacitance. These stray capacitance effects prevent sudden voltage changes, such as occur at the leading and lagging edges of pulses. Thus, an output pulse from a circuit having stray capacitance to any degree does not resemble a square wave shape as closely as an output pulse from a circuit wherein stray capacitance is substantially eliminated.

In the operated embodiment of the invention, the various elements of the interstage coupling circuit were made to have values such that capacitor 12=12 mmf., capacitor 16=0.01 mf., resistor 13=100,000 ohms, and resistor 15=20,000 ohms. The triodes 1 and 2 were the opposite halves of a type 2C51 duotriode.

With the various circuit constants indicated above, the counter of Fig. 1 was found to produce a resultant output potential like that of Fig. 4.

This resultant output potential may be utilized in various ways. In the apparatus of Fig. 1, it is applied to the control grid of a triode 36 which is so biased that it conducts current only in response to the most positive output potentials of all the decades. When the triode 36 conducts current, a more negative potential is applied from its anode through a capacitor 37 and a resistor 38 to the control grid of a triode 39. As a result, this triode conducts less current and a more positive potential is applied from its anode to an output circuit 40—41. Thus the potential of the output circuit 40—41 is raised to a predetermined positive value each time the counter repeats its cycle of operation as determined by the settings of the selector switches S1, S2 and S3.

What the invention provides is a counter including a plurality of trigger circuits which are so coupled together and have such circuit constants that the outputs from the different decades of the counter are of substantially square wave form and may be superimposed on one another to produce a resultant potential which truly represents the sum of the different output potentials.

We claim as our invention:

1. In a counter including a plurality of pairs of electron discharge elements, means including resistors and capacitors arranged to connect said pairs each in the form of a trigger circuit which has driving and driven terminals and is operable to either of two current conducting conditions in response to pulses applied to its driven terminal, said resistors and capacitors having their values selected to substantially eliminate stray capacitance in said trigger circuits at high frequencies, and coupling means connected between said trigger circuits, each of said trigger circuits including an amplifier having its output connected to the driven terminal of a following trigger circuit and a differentiating circuit coupling the driving terminal of a leading trigger circuit to the input of said amplifier.

2. In a counter including a plurality of pairs of electron discharge elements, means including resistors and capacitors arranged to connect said pairs each in the form of a trigger circuit which has driving and driven terminals and is operable to either of two current conducting conditions in response to pulses applied to its driven terminal, said resistors and capacitors having their values selected to substantially eliminate stray capacitance in said trigger circuits at high frequencies, and coupling means connected between said trigger circuits, each of said coupling means including (1) an amplifier having grid, cathode and anode electrodes, said anode being connected to the driving terminal of a following trigger circuit, a cathode resistor connected at one end to said cathode, a condenser connected in parallel with said resistor, and (2) a differentiating circuit including a capacitor connected between a driving terminal of a leading trigger circuit and said amplifier grid, and a resistor connected between said grid and said cathode resistor other end.

HOWARD C. LAWRENCE, Jr.
ROBERT R. FREAS, Jr.

REFERENCES CITED

The following references are of record in the file of this patent:

UNITED STATES PATENTS

| Number | Name | Date |
|---|---|---|
| 2,346,869 | Poole | Aug. 18, 1944 |
| 2,381,920 | Miller | Aug. 14, 1945 |
| 2,401,729 | Goldsmith | June 11, 1946 |
| 2,401,779 | Swartzel | June 11, 1946 |
| 2,409,689 | Morton | Oct. 22, 1946 |
| 2,422,698 | Miller | June 24, 1947 |

OTHER REFERENCES

Review of Scientific Instruments, vol. 9, March 1938, "A Triode Vacuum Tube Scale-of-Two Circuit," by Lifschutz et al., pages 83–89.

Electronics, April 1946, "Four-Channel Electronic Switch," by Moerman, pages 150–153.

Proceedings of the Institute of Radio Engineers, vol. 35, August 1947, Electronic Computing Circuits of the Eniac, by Burks, pages 756–767.